United States Patent
Kanno et al.

(10) Patent No.: US 7,294,315 B1
(45) Date of Patent: Nov. 13, 2007

(54) METHOD AND APPARATUS FOR DISPOSING OF FLUORINE-CONTAINING COMPOUND BY DECOMPOSITION

(75) Inventors: Shuichi Kanno, Hitachi (JP); Akio Honji, Hitachinaka (JP); Hisao Yamashita, Hitachi (JP); Shigeru Azuhata, Hitachi (JP); Shin Tamata, Ooarai (JP); Kazuyoshi Irie, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/936,426

(22) PCT Filed: Jun. 9, 1999

(86) PCT No.: PCT/JP99/03074

§ 371 (c)(1),
(2), (4) Date: Sep. 13, 2001

(87) PCT Pub. No.: WO00/74821

PCT Pub. Date: Dec. 14, 2000

(51) Int. Cl.
*B01D 53/34* (2006.01)
(52) U.S. Cl. .................. 422/168; 422/169; 422/170; 422/171; 422/172; 422/173; 422/177
(58) Field of Classification Search ........... 423/240 S, 423/239.1, 247, 244.01, 244.09, 244.1, 483; 588/248, 206; 422/168–173, 177
See application file for complete search history.

(56) References Cited

U.S. PATENT DOCUMENTS 4,935,212 A * 6/1990 Jacob ............... 423/240 R
5,759,504 A * 6/1998 Kanno et al. ........... 423/240 S

FOREIGN PATENT DOCUMENTS

| EP | 0431351 A1 | 11/1990 |
|----|------------|---------|
| EP | 885648 | * 12/1998 |
| GB | 2295101 | 5/1996 |
| JP | 51-49190 | 4/1976 |
| JP | 52-026390 | 2/1977 |
| JP | 52-26390 | 2/1977 |
| JP | 59-92022 | 5/1984 |
| JP | 61-003040 | * 1/1986 |
| JP | 4-122419 | 4/1992 |
| JP | 4-290527 | 10/1992 |
| JP | 5-220346 | 8/1993 |
| JP | 08-057255 | 3/1996 |
| JP | 08238418 A | * 9/1996 |

(Continued)

*Primary Examiner*—Glenn Caldarola
*Assistant Examiner*—Kaity Handal
(74) *Attorney, Agent, or Firm*—Mattingly, Stanger, Malur & Brundidge, P.C.

(57) ABSTRACT

Fluorine compounds such as $C_2F_6$, $CF_4$, $CHF_3$, $SF_6$ and $NF_3$, are made in contact with a fluorine compound decomposition catalyst and a catalyst the decomposition oft least one of CO, $SO_2F_2$ and $N_2O$ in the presence of water or in the presence of water and oxygen. The catalyst the decomposition oft least one of CO, $SO_2F_2$ and $N_2O$ preferably contains at least one selected from Pd, Pt, Cu, Mn, Fe, Co, Rh, Ir and Au in the form of a metal or an oxide. According to the invention, the fluorine compound can be converted to HF, which is liable to be absorbed by water or an alkaline aqueous solution, and a substance, such as CO, $SO_2F_2$ and $N_2O$, formed by decomposition of the fluorine compound can also be decomposed.

5 Claims, 7 Drawing Sheets

FOREIGN PATENT DOCUMENTS

| | | |
|---|---|---|
| JP | 10-192653 | 7/1998 |
| JP | 10-286439 | 10/1998 |
| JP | 11-070322 | 3/1999 |
| JP | 11-70322 | 3/1999 |
| JP | 11-123331 | 5/1999 |

* cited by examiner

METHOD AND APPARATUS FOR DISPOSING OF FLUORINE-CONTAINING COMPOUND BY DECOMPOSITION

FIELD OF THE INVENTION

The present invention relates to a process and an apparatus for the decomposition of fluorine compound such as PFC (perfluorocarbon), HFC (hydrofluorocarbon), $SF_6$ and $NF_3$. More particularly, the invention relates to a process and an apparatus for the decomposition of fluorine compounds that generates a gaseous substance, such as carbon monoxide (CO), $N_2O$ and $SO_2F_2$ (sulfuryl fluoride), upon the decomposition, particularly hydrolysis, of the fluorine compounds over a catalyst.

Examples of the fluorine compounds that generates a gaseous substance, such as carbon monoxide (CO), $N_2O$ and $SO_2F_2$ (sulfuryl fluoride), upon the decomposition of the fluorine compounds over a catalyst include PFC, HFC, $SF_6$ and $NF_3$. These fluorine compounds are used as a semiconductor etching gas and a semiconductor cleaning gas. $SF_6$ gas is also used as an insulating medium for a circuit breaker. The process and the apparatus for the decomposition of fluorine compounds according to the invention is suitable for a process and an apparatus for the decomposition of waste fluorine compounds in these fields.

BACKGROUND OF THE INVENTION

Hydrolysis is one process for the decomposition of fluorine compounds, such as PFC and HFC. In this process, water is added to gaseous fluorine compounds to react them, and fluorine contained in the fluorine compounds is converted to hydrogen fluoride (HF), which is subsequently absorbed by water or an alkaline aqueous solution.

Japanese Patent Laid-Open No. 192653/1998 discloses a process, in which water vapor is added to a $C_2F_6$ gas or an $NF_3$ gas, which are kinds of the fluorine compounds, and the fluorine compounds is made to contact with a catalyst containing at least one selected from alumina, titania, silica and zirconia at a temperature from 400° C. to 800° C. to hydrolyze the fluorine compounds. The publication discloses that when an oxidative gas, such as oxygen, is contained upon conducting hydrolysis, an oxidation reaction of carbon monoxide (CO), which is formed during the hydrolysis reaction, can be simultaneously induced. It also discloses that after removing hydrogen fluoride from a gas formed by the hydrolysis, the remaining gas may be made in contact with a CO oxidation catalyst to oxidize CO to $CO_2$.

It is also known that an organic halogen compounds containing halogen, such as chlorine, fluorine and bromine, can be simultaneously subjected to both hydrolysis and oxidative decomposition as disclosed in Japanese Patent Laid-Open No. 122419/1992 and Japanese Patent Laid-Open No. 220346/1993. These publications specifically disclose decomposition processes of a chlorine compound such as Freon and PCB.

In the case where organic fluorine compounds such as PFC and HFC, is hydrolyzed, a CO gas is formed associated with hydrogen fluoride. Therefore, a CO gas is necessarily processed upon hydrolysis of an organic fluorine compounds. Japanese Patent Laid-Open No. 192653/1998 discloses that CO is oxidized to $CO_2$ by containing an oxidative gas upon hydrolysis of fluorine compounds, or in alternative, CO is oxidized with a catalyst after removing hydrogen fluoride from a gas formed by hydrolysis. However, as a result of investigation conducted by the inventors, there is a limitation in removal of CO only by containing oxygen or air upon hydrolysis of fluorine compounds. Furthermore, the process of contacting a gas formed by hydrolysis with a CO oxidation catalyst after removing hydrogen fluoride exhibits a poor efficiency because the high temperature gas formed by hydrolysis is cooled to room temperature for removing hydrogen fluoride and is then again heated.

The inventors have found that in the case where a fluorine compound such as $SF_6$ and $NF_3$, is decomposed over a catalyst, the same problem occurs as in the case of decomposition of PFC and HFC. Specifically, it has been found that when $SF_6$ or $NF_3$ is hydrolyzed, $SO_2F_2$ or $N_2O$ is by-produced together with hydrogen fluoride. These by-products are also preferably decomposed.

Japanese Patent Laid-Open No. 286439/1998 discloses a process for the decomposition of gaseous fluorine-containing compound such as $CF_4$, $C_2F_6$, and $C_3F_8$, by contacting the compounds with molecular oxygen and water in the presence of a catalyst. There is a possibility of forming CO since the supplied amount of molecular oxygen is such an amount that is sufficient to convert a carbon content (carbon atoms) in the fluorine-containing compounds to carbon dioxide and carbon monoxide.

Japanese Patent Laid-Open No. 192653/1998, Japanese Patent Laid-Open No. 286439/1998, Japanese Patent Laid-Open No. 122419/1992 and Japanese Patent Laid-Open No. 220346/1993 noted in the foregoing fail to disclose by-production of $SO_2F_2$ or $N_2O$ upon hydrolysis of $SF_6$ or $NF_3$, and also fail to disclose a process for removing these substances.

SUMMARY OF THE INVENTION

An objective of the invention is to provide a process and an apparatus for the decomposition of gaseous substance, such as CO, $SO_2F_2$ and $N_2O$, formed upon decomposition of fluorine compounds with a high efficiency under such a state that the gaseous compound still contains hydrogen fluoride.

Another object of the invention is to provide a process and an apparatus for the decomposition of and removing $SO_2F_2$.

The invention relates to, as a first embodiment, a process for the decomposition of fluorine compounds with a catalyst comprising a step of contacting the fluorine compounds, in the presence of water vapor, oxygen and an inert gas as a diluent gas, with fluorine compounds decomposition catalyst and a catalyst the decomposition of at least one of CO, $SO_2F_2$ and $N_2O$. The fluorine compounds decomposition catalyst and the catalyst for decomposing CO, $SO_2F_2$ and $N_2O$ may be a mixture or may be a two-stage method, in which the fluorine compounds decomposition catalyst is arranged upstream and the catalyst for decomposing CO, $SO_2F_2$ and $N_2O$ is arranged downstream.

The invention also relates to, as a second embodiment, a process for the decomposition of fluorine compounds comprising steps of decomposing the fluorine compounds, in the presence of water vapor and an inert gas as a diluent gas without addition of oxygen or an oxygen-containing gas; adding oxygen or an oxygen-containing gas to a gas formed by the decomposition; and making the gas in contact with the catalyst the decomposition of at least one of CO, $SO_2F_2$ and $N_2O$.

The invention also relates to, as a third embodiment, a process for decomposing $SO_2F_2$ comprising a step of contacting a gas containing $SO_2F_2$ with a catalyst in the presence of water vapor and oxygen.

The catalyst for the decomposition of at least one of CO, $SO_2F_2$ or $N_2O$ used herein will be referred to as a harmful component removing catalyst. The harmful component removing catalyst preferably contain at least one selected from Pd, Pt, Cu, Mn, Fe, Co, Rh, Ir and Au in the form of a metal or an oxide. It is also preferred to further contain at least one oxide selected from La and Ba, whereby the heat resistance is improved.

The harmful component removing catalyst is preferably carried on the surface of a carrier upon use. The carrier is preferably at least one selected from alumina, titania and zirconia.

In the harmful component removing catalyst, the amount of at least one selected from Cu, Mn, Fe and Co carried on the carrier is preferably from 0.1 to 20 wt % as an amount of an oxide based on the weight of the carrier. The amount of at least one selected from Pd, Pt, Rh, Ir and Au carried on the carrier is preferably from 0.05 to 2 wt % as an amount of a metal based on the weight of the carrier.

The amount of at least one oxide selected from La and Ba carried on the carrier is also preferably from 0.1 to 20 wt % on the weight of the carrier.

Examples of the preferred harmful component removing catalyst include a catalyst of Pd and La carried on alumina, a catalyst of Pt and La carried on alumina, a catalyst of Rh and La carried on alumina, a catalyst of Au and La carried on alumina, a catalyst of Ir and La carried on alumina, a catalyst of Pd carried on alumina, a catalyst of Pt carried on alumina, a catalyst of Cu carried on alumina, a catalyst of Mn carried on alumina, a catalyst of Pd and W carried on titania and a catalyst of Co carried on alumina.

The gas having been decomposed by contacting with the harmful component removing catalyst is preferably put through water or an alkaline aqueous solution to remove a water-soluble component contained in the gas, such as hydrogen fluoride. Examples of the alkaline aqueous solution include those of sodium hydroxide and calcium hydroxide.

According to the first and second embodiments of the invention, fluorine contained in a fluorine compound such as PFC, HFC, $SF_6$ and $NF_3$, is converted to HF, and CO, $SO_2F_2$ and $N_2O$ formed associated with decomposition of the fluorine compounds can also be decomposed. It is considered that CO is oxidized to $CO_2$, $SO_2F_2$ is decomposed to $SO_3$ and HF, and $N_2O$ is decomposed to $NO_2$ or NO.

According to the third embodiment of the invention, $SO_2F_2$ can be decomposed and converted to $SO_3$ and HF.

Examples of fluorine compounds that generates CO upon hydrolysis include PFC, such as $CF_4$, $C_2F_6$, $C_3F_8$, $C_4F_8$, $C_5F_8$ and $CHF_3$, and HFC, such as $C_2H_2F_4$. Examples of fluorine compounds that generates $SO_2F_2$ upon hydrolysis include $SF_6$. An example of a fluorine compounds that generates $N_2O$ upon hydrolysis is $NF_3$. The invention can be applied to the decomposition process of these fluorine compounds. However, the invention is not limited to these fluorine compounds.

In the first embodiment of the invention, oxidation of CO also proceeds upon decomposing the fluorine compounds. Therefore, there is an effect in that the activity of the harmful component removing catalyst is hard to be deteriorated in comparison to the second embodiment. According to the second embodiment, the cost for heating the gas can be reduced because the gas amount can be decreased in comparison to the first embodiment to such an extent that oxygen or an oxygen-containing gas is not added upon decomposition of the fluorine compounds.

Examples of the factors exerting an influence on decomposition of fluorine compounds include the concentration of the fluorine compounds in the gas to be processed, the amount of the moisture, the reaction temperature, the material of the catalyst, the preparation method of the catalyst and the space velocity. The space velocity is a value obtained by dividing the gas flow amount (ml/h) upon passing the gas to be processed through the catalyst by the catalyst amount (ml).

The concentration of the fluorine compounds in the gas to be processed is preferably in the range of from 0.1 to 5 vol %. When the concentration of the fluorine compounds in the gas to be processed is too large, a high decomposition rate cannot be obtained. In order to adjust the concentration of the fluorine compounds, it is preferred to add an inert gas, such as nitrogen, argon and helium.

The moisture is necessarily added in such an amount that hydrogen atoms are present in the same number or more as the number of fluorine atoms contained in the fluorine compounds, and it is preferably from 5 to 75 times the concentration of the fluorine compounds. When the amount of water is too small, decomposition of the fluorine compounds does not proceed.

The reaction temperature is preferably in the range from 650° C. to 850° C. When the reaction temperature is too low, only a low decomposition rate is obtained. Even when the reaction temperature is increased beyond 850° C., the reaction rate is substantially not improved.

As the fluorine compounds decomposition catalyst, a catalyst containing a combination of aluminum and nickel, a combination of aluminum and zinc, or a combination of aluminum and titanium is preferably used in the form of an oxide. The oxide is mainly formed from alumina with nickel oxide, zinc oxide or titanium oxide, and a mixed oxide (composite oxide), such as $NiAl_2O_4$, may also be mixed. The invention is not limited to these catalysts, and other catalysts described, for example, in Japanese Patent Laid-Open No. 192653/1998 may also be used. Among the three catalysts listed in the foregoing, the catalyst containing a combination of aluminum and nickel in the form of an oxide is the most preferred. As for the composition of the aluminum-nickel catalyst, the molar ratio Ni/Al is preferably in the range of from 50/50 to 1/99.

The preparation method of the fluorine compounds decomposition catalyst may be conducted by either the precipitation method, the impregnation method or the kneading method, which have been known in the art. Examples of the raw materials for preparing the catalyst include a nitrate, an ammine complex, an ammonium salt, a chloride and a sulfate. The catalyst may be used by forming into a granular form or a honeycomb form, or in alternative, by coating on the surface of a honeycomb or a plate formed with ceramics or a metal. The catalyst can be formed into a granular form or a honeycomb form by an extrusion forming method, a tablet punching method or a rolling granulation method.

The space velocity (SV) upon contacting the gas to be processed with the fluorine compounds decomposition catalyst is preferably from 100 to 10,000/h, and more preferably from 100 to 1,500/h, for obtaining a high decomposition rate.

It is sufficient that the amount of oxygen in the gas to be processed is from 0.2 to 15 vol % in the case where the concentration of the fluorine compounds is from 0.1 to 5 vol % although it depends on the amount of the fluorine compounds to be decomposed since the object of addition of oxygen is to oxidize CO.

The harmful component removing catalyst can also be prepared in the similar manner as the preparation of the fluorine compounds decomposition catalyst. The precipitation method, the impregnation method and the kneading method having been known can be applied. Examples of the raw materials for preparing the catalyst include a nitrate, an ammine complex, an ammonium salt, a chloride and a sulfate. The catalyst may be used by forming into a granular form or a honeycomb form, or in alternative, by coating on the surface of a honeycomb or a plate formed with ceramics or a metal. The harmful component removing catalyst is particularly preferably prepared by impregnating a granular carrier with a solution containing Pd or Pt, followed by drying and baking. The harmful component removing catalyst is preferably used after eventually baking at a temperature of from 600° C. to 850° C., so as to suppress decrease in the catalyst activity during use due to aggregation of granules. In the case where titania is used as the carrier, it is preferred that the surface of titania is coated with tungsten oxide since titania is liable to suffer poisoning with fluorine.

The process for the decomposition of fluorine compounds according to the invention is suitable for a process for the decomposition of fluorine compounds contained in an exhaust gas from a semiconductor etching line. The concentration of a fluorine compounds in the exhaust gas from a semiconductor etching line is generally from 0.5 to 5 vol %, and the balance is mainly $N_2$. The exhaust gas from a semiconductor etching line is added with air and water, and then is made in contact with the fluorine compounds decomposition catalyst and the harmful component removing catalyst, whereby the fluorine compounds contained in the exhaust gas from a semiconductor etching line is converted to HF, and CO, $SO_2F_2$ and $N_2O$ can also be removed.

The apparatus for the decomposition of fluorine compounds according to the invention will be described below.

One embodiment of the apparatus for the decomposition of fluorine compounds according to the invention comprises a reactor having a catalyst for decomposing the fluorine compounds and a harmful component removing catalyst charged therein; a heater for heating the catalysts in the reactor; a moisture supplying unit for adding moisture to the fluorine compounds supplied to the reactor; an oxygen supplying unit for adding oxygen or an oxygen-containing gas; and an inert gas supplying unit for adding an inert gas as a diluent gas.

Another embodiment of the apparatus for the decomposition of fluorine compounds according to the invention comprises a reactor having a catalyst for decomposing the fluorine compounds charged upstream therein and a harmful compound removing catalyst charged downstream therein, whereby the two catalysts are contained in the reactor in pile form, one above the other, as shown in FIGS. 1, 9 and 10; a heater for heating the catalysts in the reactor; a moisture supplying unit for adding moisture to the fluorine compounds supplied to the reactor; an inert gas supplying unit for adding an inert gas as a diluent gas; and an oxygen supplying unit for adding oxygen or an oxygen-containing gas to a gas stream that flows out from the catalyst for decomposing the fluorine compounds and flows in the harmful component removing catalyst.

A further embodiment of the apparatus for the decomposition of fluorine compounds according to the invention is an apparatus for the decomposition of and removing $SO_2F_2$ from a gas containing $SO_2F_2$ comprising a reactor having an $SO_2F_2$ decomposition catalyst charged therein; and means for adding water and oxygen to the gas supplied to the reactor.

The apparatus for the decomposition of fluorine compounds according to the invention may further comprise a gas scrubbing tower having water or an alkaline aqueous solution. The gas scrubbing tower is provided in the subsequent stage of the reactor. In order to make the gas be in well contact with water or an alkaline aqueous solution in the gas scrubbing tower, plastic particles, such as polypropylene, may be charged therein.

A pre-heater for pre-heating the gas to be processed containing the fluorine compounds may be provided in the preceding stage of the reactor. The pre-heater may have such a simple structure that a heater is provided outside the vessel. In the case where the apparatus of the invention is applied to processing of a fluorine compounds-containing gas having been used for an etching treatment of a semiconductor, a pre-treatment tower for removing a water-soluble component containing the etching exhaust gas is preferably provided on the upstream of the pre-heater. The pre-treatment tower may have such a simple structure containing a device for spraying water into the etching exhaust gas.

A cooling chamber for cooling the exhaust gas discharged from the reactor may be provided between the reactor and the gas scrubbing tower. The cooling chamber preferably has a spray nozzle for spraying water or an alkaline aqueous solution. Since the absorbing rate of hydrogen fluoride in the gas scrubbing tower is higher when the gas temperature is lower, it is effective to cool the gas discharged from the reactor before supplying to the gas scrubbing tower.

DETAILED DESCRIPTION OF PREFERRED EMBODIMENTS

Figure 1:
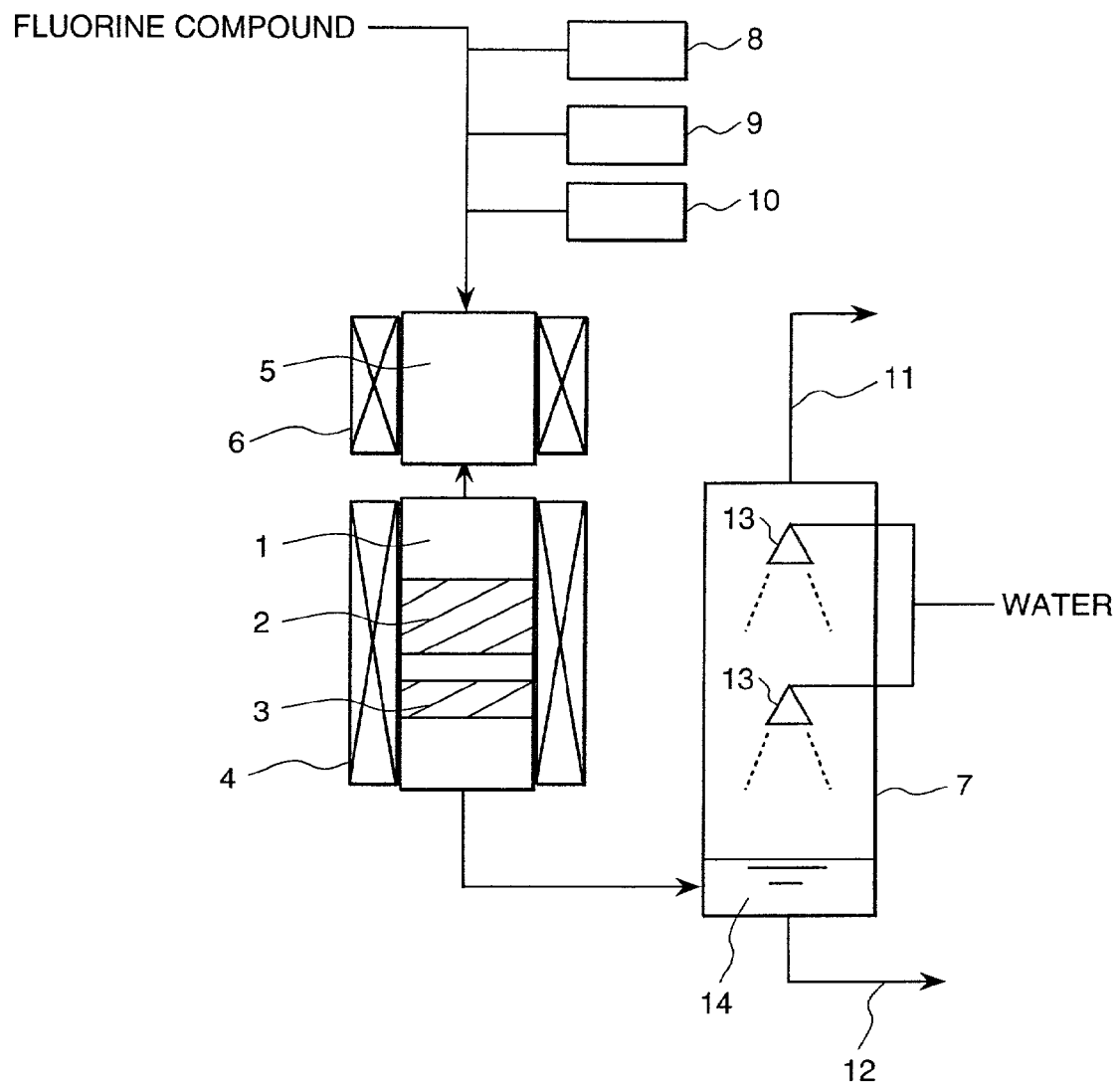
FIG. 1 is a schematic diagram showing one embodiment of an apparatus for the decomposition of fluorine compounds according to the invention.

An apparatus for the decomposing fluorine compounds having the structure shown in FIG. 1 was produced, and an experiment for the decomposing fluorine compounds was conducted. The apparatus shown in FIG. 1 comprises a reactor 1, a pre-heater 5, a nitrogen gas supplying unit 8 for adding a nitrogen gas to the fluorine compounds, an oxygen supplying unit 9 for adding oxygen or an oxygen-containing gas to the fluorine compounds, a pure water supplying unit 10 for adding pure water to the fluorine compounds, and a gas scrubbing tower 7 for scrubbing a gas stream flow out from the reactor 1 with water. The pre-heater 5 has a heater 6, and the reactor 1 has a heater 4. The reactor 1 contains a fluorine compounds decomposition catalyst 2 and harmful components removing catalyst 3. The gas scrubbing tower 7 has spray nozzles 13 for spraying water. In the gas scrubbing tower 7, water 14 absorbing hydrogen fluoride and other water-soluble components are accumulated at a bottom part of the gas scrubbing tower 7 and then discharged to the outside of the gas scrubbing tower 7 through a drain pipe 12. The gas, from which hydrogen fluoride has been removed in the gas scrubbing tower 7, is discharged to the outside of the gas scrubbing tower 7 through a gas discharging pipe 11.

EXAMPLE 1

A decomposition treatment of $SF_6$ was conducted by using an apparatus shown in FIG. 1. An aluminum-nickel catalyst was used as the fluorine compounds decomposition catalyst 2. The composition of the catalyst was that the molar ratio Al/Ni was 80/20. The catalyst was prepared in the following manner. Commercially available boehmite powder was dried by calcinated at a temperature of 120° C. for 1 hour. An aqueous solution obtained by dissolving 210.82 g of nickel nitrate hexahydrate was added to 200 g of the powder, followed by mixing and kneading. Thereafter, the mixture was baked at a temperature of from 250° C. to 300° C. for about 2 hours and calcinated at a temperature of 700° C. for 2 hours. After calcination, pulverization and classification were conducted to obtain a particle diameter from 0.5 to 1 mm. A catalyst containing aluminum and nickel in the form of an oxide was thus obtained.

A catalyst containing Pd and La carried on alumina was used as the harmful component removing catalyst 3. The preparation method of the catalyst is as follows. Commercially available granular alumina having a particle diameter of from 2 to 4 mm (NKHD-24 produced by Sumitomo Chemical Industries, Ltd.) was impregnated with $La_2O_3$ to such an extent that $La_2O_3$ was contained in an amount of 10 wt % based on the weight of alumina. Specifically, an aqueous solution obtained by dissolving 26.84 g of lanthanum nitrate hexahydrate in pure water was added to 100 g of alumina to conduct impregnation with La. Thereafter, it was calcinated at 120° C. for 2 hours and then further calcinated to 700° C. The resulting La-carried alumina was impregnated with Pd to such an extent that Pd is contained in an amount of 0.5 wt % based on the weight of the La-carried alumina. That is, 100 g of La-carried alumina was impregnated with an aqueous solution obtained by dissolving 11.26 g of a palladium nitrate solution containing 4.439 wt % of Pd in pure water. Thereafter, it was calcinated at 120° C. for 2 hours and then further calcinated at to 700° C. A Pd and La-carried alumina catalyst was thus obtained.

The experiment of a decomposition treatment $SF_6$ was firstly conducted without charging the harmful component removing catalyst 3, and then conducted with the harmful component removing catalyst charged therein. The $SF_6$ gas was added with nitrogen and oxygen and further added with pure water by using a microtube pump. In the gas to be processed, the $SF_6$ concentration was 0.5 vol %, the $O_2$ concentration was 4 vol %, and a water vapor concentration was 37.5 vol % (75 times the molar number of $SF_6$). The gas to be processed was supplied to the reactor 1 heated and maintained at a temperature of 750° C. The space velocity (SV) of the gas to be processed was 1,000 $h^{-1}$ at the fluorine compounds removing catalyst 2 and 5,000 $h^{-1}$ at the harmful component removing catalyst 3. The gas flowing out from the reactor 1 was supplied to the gas scrubbing tower 7 to absorb HF and other water-soluble components, such as $SO_3$, in water. The $SO_2F_2$ concentration of the exhaust gas flowing out from the gas scrubbing tower 7 was measured by TCD (thermal conductivity detector) gas chromatography. The gas of $SF_6$ concentration was measured by TCD gas chromatography. The TCD gas chromatograph used had a detection limit of $SO_2F_2$ concentration of 5 ppm.

$SF_6$ was treated with the fluorine compounds decomposition catalyst containing aluminum and nickel as an oxide. $SF_6$ conversion was obtained more then 80% and was substantially constant from the initial stage of the experiment to the time after 2,000 hours.

Figure 2:
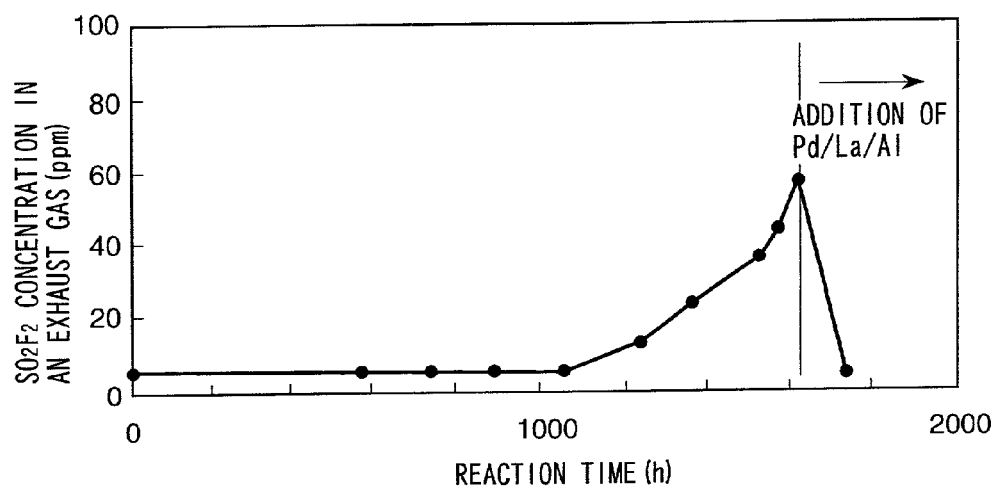
FIG. 2 is a graph showing the relationship between the $SO_2F_2$ gas concentration in an exhaust gas scrubbing tower and the reaction time in decomposition of $SF_6$.

FIG. 2 shows the relationship between the $SO_2F_2$ concentration and the reaction time. The $SO_2F_2$ concentration was lower than 5 ppm, the detection limit, from the initial stage of the experiment to the time after 1,000 hours, but was quickly increased beyond 1,000 hours and detected 57 ppm after 1,600 hours. The experiment was further continued after charging the harmful component removing catalyst 3. As a result, the $SO_2F_2$ concentration was decreased to the level lower than 5 ppm. It has been confirmed from the foregoing that the Pd and La-carried alumina catalyst is effective to decompose $SO_2F_2$ in the presence of hydrogen fluoride.

EXAMPLE 2

A mixed gas of $CF_4$ and $CHF_3$ was decomposed by using the apparatus for the decomposing fluorine compounds shown in FIG. 1. A mixed gas of $CF_4$ and $CHF_3$ is often used as an etching gas for a semiconductor manufacturing. The fluorine compounds decomposition catalyst 2 was the same as that used in Example 1. The harmful component removing catalyst 3 was the same as that used in Example 1 except that commercially available granular alumina having a particle diameter of from 2 to 4 mm (NKHD-24 produced by Sumitomo Chemical Industries, Ltd.) was pulverized to a diameter of from 0.5 to 1 mm, followed by drying in the air at 120° C. for 2 hours. In the gas to be processed, the $CF_4$ concentration was 0.25 vol %, the $CHF_3$ concentration was 0.25 vol %, the $O_2$ concentration was 4 vol %, and the water vapor concentration was 25 vol %. The reaction temperature was 700° C. The experiment was conducted in two cases, i.e., only the fluorine compounds decomposition catalyst 2 was charged in the reactor 1 but the harmful component removing catalyst 3 was not charged, and both the fluorine compounds decomposition catalyst 2 and the harmful component removing catalyst 3 were charged in the reactor 1. The space velocity of the gas to be processed was 1,000 $h^{-1}$ at the fluorine compounds removing catalyst 2 and 10,000 $h^{-1}$ at the harmful component removing catalyst 3. The CO concentration of the exhaust gas flowing out from the gas scrubbing tower 7 was measured by a TCD gas chromatography. The TCD gas chromatograph used had a detection limit of CO concentration of 1 ppm.

Figure 3:
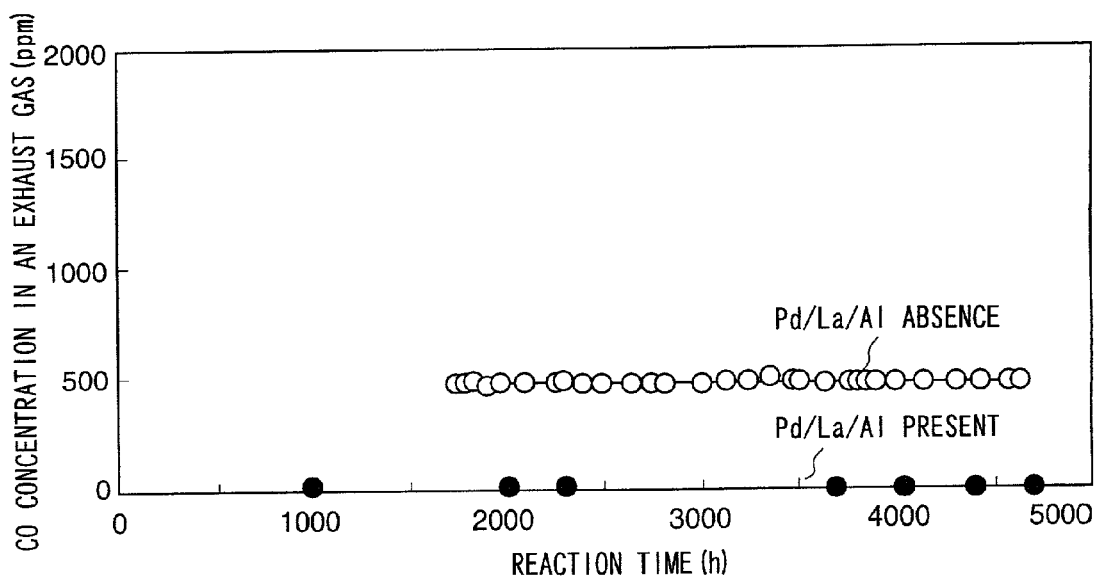
FIG. 3 is a graph showing the relationship between the CO concentration in an exhaust gas scrubbing tower and the reaction time in the decomposition of a mixed gas of $CF_4$ and $CHF_3$.

FIG. 3 shows the relationship between the reaction time from the start of the experiment and the CO concentration. The CO concentration was as large as about 500 ppm when the treatment was conducted only with the aluminum-nickel catalyst, but the CO concentration could be decreased to the level that could not be detected by the TCD gas chromatograph by providing the Pd and La-carried alumina catalyst.

EXAMPLE 3

Figure 4:
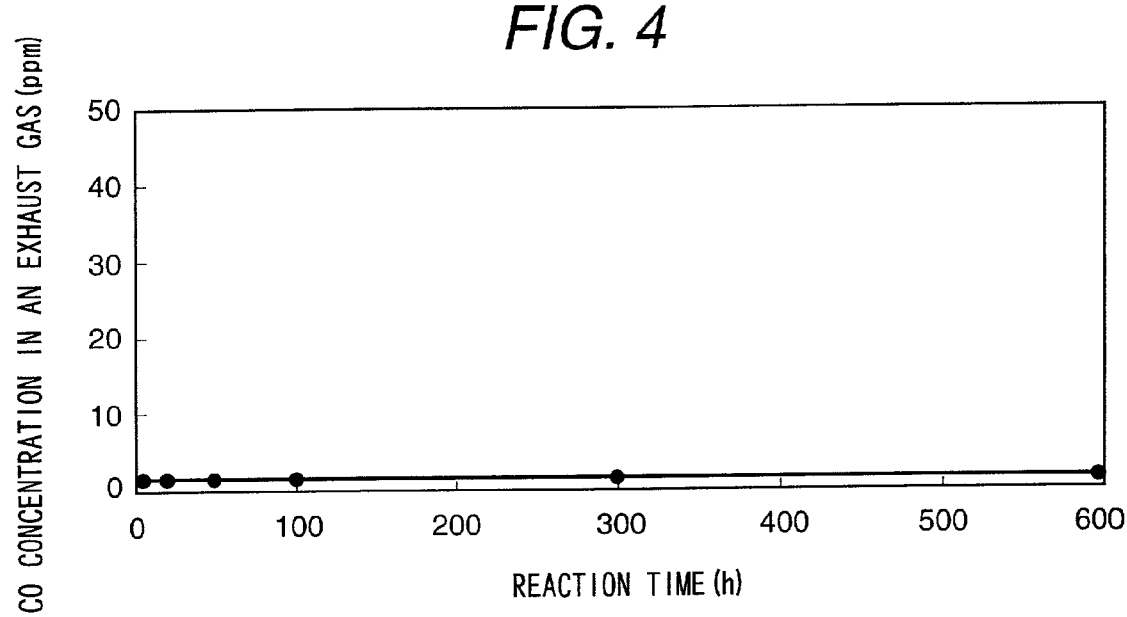
FIG. 4 is a graph showing the relationship between the CO concentration in an exhaust gas scrubbing tower and the reaction time in the decomposition of $C_2F_6$.

$C_2F_6$ was decomposed by using the apparatus shown in FIG. 1. The fluorine compounds decomposition catalyst 2 and the harmful component removing catalyst 3 used were the same as those used in Example 1. In the gas to be processed, the $C_2F_6$ concentration was 0.5 vol %, the oxygen concentration was 4 vol %, and the water vapor concentration was 25 vol %. The reaction temperature was 750° C. The space velocity was the same as in Example 1. As a result, as shown in FIG. 4, the CO concentration in the exhaust gas flowing out from the gas scrubbing tower was constantly about 1 ppm from the initial stage of the treatment to the time after 600 hours.

EXAMPLE 4

Figure 5:
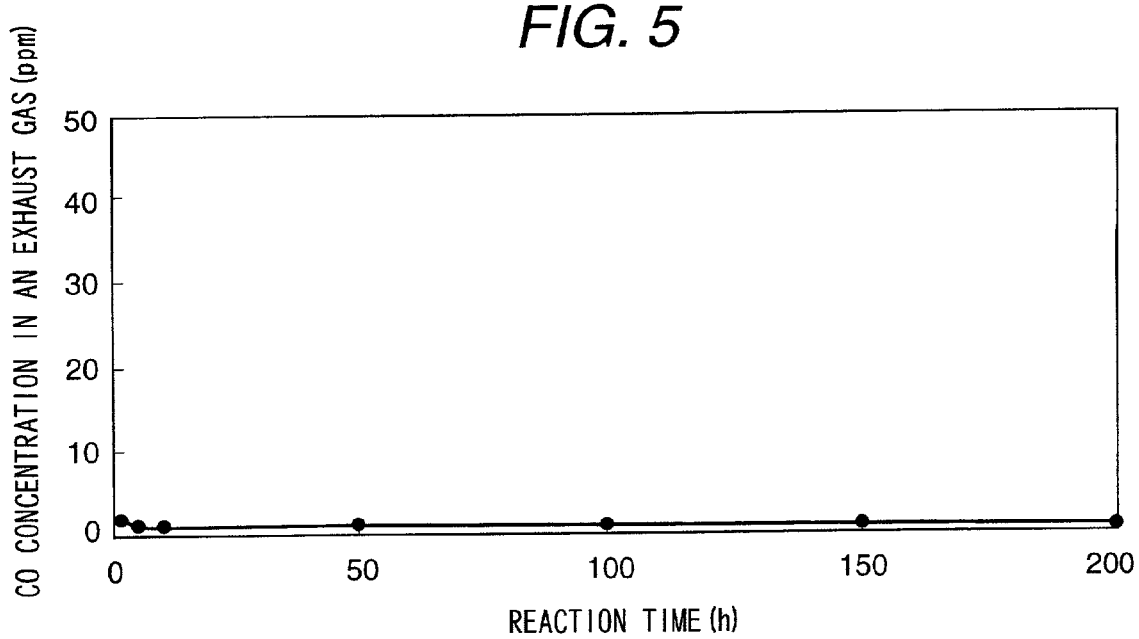
FIG. 5 is a graph showing the relationship between the CO concentration in an exhaust gas scrubbing tower and the reaction time in decomposition of $C_4F_8$.

$C_4F_8$ was decomposed by using the apparatus shown in FIG. 1. The fluorine compounds decomposition catalyst 2 and the harmful component removing catalyst 3 used were the same as those used in Example 1. In the gas to be processed, the $C_4F_8$ concentration was 0.2 vol %, the oxygen concentration was 4 vol %, and the water vapor concentration was 10 vol %. The reaction temperature was 800° C. The space velocity was the same as in Example 1. As a result, as shown in FIG. 5, the CO concentration in the exhaust gas flowing out from the gas scrubbing tower was constantly about 1 ppm from the initial stage of the treatment to the time after for 200 hours.

EXAMPLE 5

Figure 6:
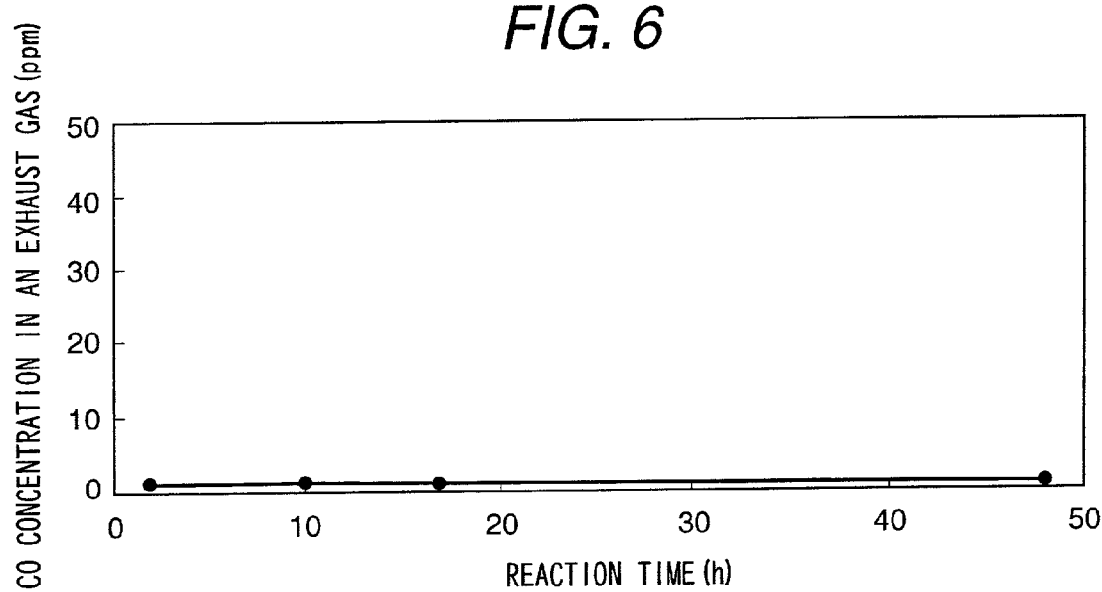
FIG. 6 is a graph showing the relationship between the CO concentration in an exhaust gas scrubbing tower and the reaction time in the decomposition of $C_3F_8$.

$C_3F_8$ was decomposed by using the apparatus shown in FIG. 1. The fluorine compounds decomposition catalyst 2 and the harmful component removing catalyst 3 used were the same as those used in Example 1. In the gas to be processed, the $C_3F_8$ concentration was 0.2 vol %, the oxygen concentration was 4 vol %, and the water vapor concentration was 10 vol %. The reaction temperature was 800° C. The space velocity was the same as in Example 1. As a result, as shown in FIG. 6, the CO concentration in the exhaust gas flowing out from the gas scrubbing tower was constantly about 1 ppm from the initial stage of the treatment to the time after lapsing for 48 hours.

EXAMPLE 6

Figure 7:
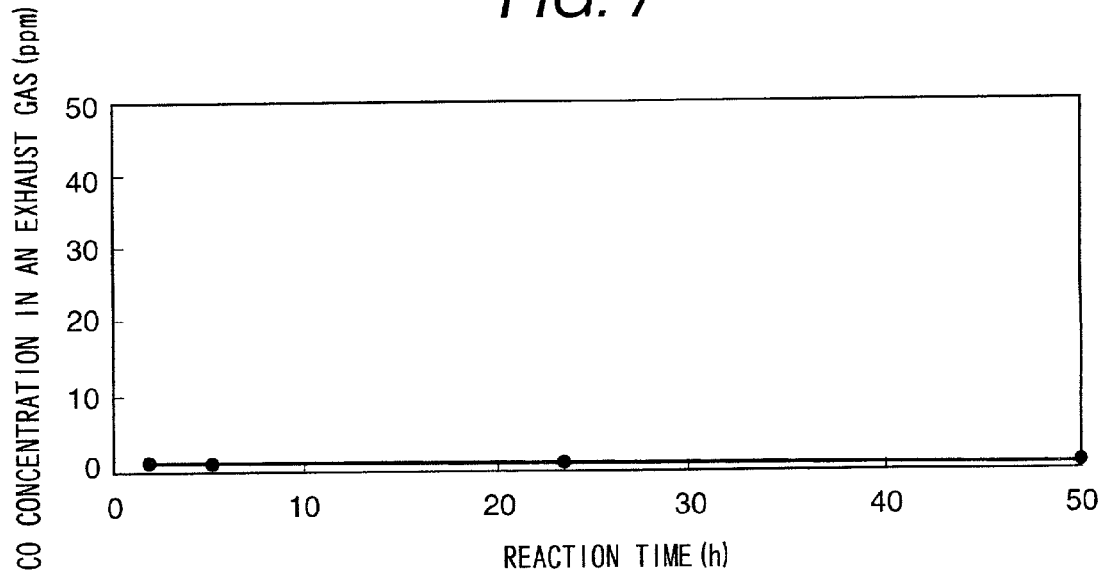
FIG. 7 is a graph showing the relationship between the CO concentration in an exhaust gas scrubbing tower and the reaction time in decomposition of $C_5F_8$.

$C_5F_8$ was decomposed by using the apparatus shown in FIG. 1. The fluorine compounds decomposition catalyst 2 and the harmful component removing catalyst 3 used were the same as those used in Example 1. In the gas to be processed, the $C_5F_8$ concentration was 0.2 vol %, the oxygen concentration was 4 vol %, and the water vapor concentration was 10 vol %. The reaction temperature was 800° C. The space velocity was the same as in Example 1. As a result, as shown in FIG. 7, the CO concentration in the exhaust gas flowing out from the gas scrubbing tower was constantly about 1 ppm from the initial stage of the treatment to the time after lapsing for 50 hours.

EXAMPLE 7

A fluorine compounds containing $C_4F_8$ was decomposed by using the apparatus shown in FIG. 1 while the material of the harmful component removing catalyst 3 was changed. The fluorine compounds decomposition catalyst 2 was the same as that used in Example 1. In the gas to be processed, the $C_4F_8$ concentration was 0.5 vol %, the oxygen concentration was 4 vol %, and the water vapor concentration was 25 vol %. The reaction temperature was 700° C. The space velocity was 1,000 h−1 at the fluorine compounds decomposition catalyst 2 and 3,000 h−1 at the harmful component removing catalyst 3.

The composition and the preparation method of the harmful component removing catalyst 3 will be described below.

(1) Pd and La-Carried Alumina Catalyst

A Pd and La-carried alumina catalyst was prepared in the same manner as in Example 2.

(2) Pt and La-Carried Alumina Catalyst

La was carried on alumina in the same manner as in the preparation of the Pd and La-carried alumina in Example 2. The resulting La-carried alumina was impregnated with Pt in such a manner that Pt was contained in an amount of 0.5 wt % of the weight of the La-carried alumina. Specifically, 100 g of the La-carried alumina was impregnated with a solution obtained by dissolving 11.08 g of a dinitrodiammine platinum nitric acid solution containing 4.514 wt % of Pt as a metal in pure water. Thereafter, it was dried at 120° C. in the air for 2 hours and further calcinated at a temperature of 700° C. in the air. As a result, a Pt and La-carried alumina catalyst was obtained.

(3) Ph and La-Carried Alumina Catalyst

The procedures until carrying La on alumina were the same as in Example 2. The resulting La-carried alumina was impregnated with Rh in such a manner that Rh was contained in an amount of 0.5 wt % of the weight of the La-carried alumina. That is, 100 g of the La-carried alumina was impregnated with a solution obtained by dissolving 11.31 g of a rhodium nitrate solution containing 4.422 wt % of Rh as a metal in pure water. Thereafter, it was dried at a temperature of 120° C. in the air for 2 hours and further calcinated at a temperature of 700° C. As a result, a Rh and La-carried alumina catalyst was obtained.

(4) Au and La-Carried Alumina Catalyst

The procedures until carrying La on alumina were the same as in Example 2. The resulting La-carried alumina was impregnated with Au in such a manner that Au was contained in an amount of 0.5 wt % of the weight of the La-carried alumina. That is, 100 g of the La-carried alumina was impregnated with a solution obtained by dissolving 10 g of chloroauric acid containing 50 g/l of gold as a metal in pure water. Thereafter, it was dried at a temperature of 120° C. in the air for 2 hours and further calcinated at a temperature of 700° C. As a result, an Au and La-carried alumina catalyst was obtained.

(5) Ir and La-Carried Alumina Catalyst

The procedures until carrying La on alumina were the same as in Example 2. The resulting La-carried alumina was impregnated with Ir in such a manner that Ir was contained in an amount of 0.5 wt % of the weight of the La-carried alumina. That is, 100 g of the La-carried alumina was impregnated with a solution obtained by dissolving 10.74 g of a chloroiridic acid solution containing 4.656 wt % of Ir as a metal in pure water. Thereafter, it was dried at a temperature of 120° C. in the air for 2 hours and further calcinated at a temperature of 700° C. As a result, an Ir and La-carried alumina catalyst was obtained.

(6) Pd-Carried Alumina Catalyst

Commercially available granular alumina having a particle diameter of from 2 to 4 mm (NKHD-24 produced by Sumitomo Chemical Industries, Ltd.) was pulverized to a diameter of from 0.5 to 1 mm, and then dried in the air at 120° C. for 2 hours. After drying, the alumina was impregnated with Pd in such a manner that Pd was contained in an amount of 0.5 wt % of the weight of the alumina. That is, 100 g of the alumina was impregnated with a solution obtained by dissolving 11.26 g of a palladium nitrate solution containing 4.439 wt % of Pd as a metal in pure water. Thereafter, it was dried at a temperature of 120° C. in the air for 2 hours and further calcinated at a temperature of 700° C. As a result, a Pd-carried alumina catalyst was obtained.

(7) Pt-Carried Alumina Catalyst

Commercially available granular alumina having a particle diameter of from 2 to 4 mm (NKHD-24 produced by Sumitomo Chemical Industries, Ltd.) was pulverized to a diameter of from 0.5 to 1 mm, and then dried in the air at 120° C. for 2 hours. After drying, the alumina was impregnated with Pt in such a manner that Pt was contained in an amount of 0.5 wt % of the weight of the alumina. That is, 100 g of the alumina was impregnated with a solution obtained by dissolving 11.08 g of a dinitrodiammine platinum nitric acid solution containing 4.514 wt % of Pt as a metal in pure water. Thereafter, it was dried at a temperature of 120° C. in the air for 2 hours and further calcinated at a temperature of 700° C. As a result, a Pt-carried alumina catalyst was obtained.

(8) Cu-Carried Alumina Catalyst

Commercially available granular alumina having a particle diameter of from 2 to 4 mm (NKHD-24 produced by Sumitomo Chemical Industries, Ltd.) was pulverized to a diameter of from 0.5 to 1 mm, and then dried in the air at 120° C. for 2 hours. After drying, the alumina was impregnated with Cu in such a manner that CuO was contained in an amount of 10 wt % of the weight of the alumina. That is, 100 g of the alumina was impregnated with an aqueous solution obtained by dissolving 30.4 g of copper nitrate trihydrate in pure water. Thereafter, it was dried at a temperature of 120° C. in the air for 2 hours and further calcinated at a temperature of 700° C. As a result, a Cu-carried alumina catalyst was obtained.

(9) Mn-Carried Alumina Catalyst

Commercially available granular alumina having a particle diameter of from 2 to 4 mm (NKHD-24 produced by Sumitomo Chemical Industries, Ltd.) was pulverized to a diameter of from 0.5 to 1 mm, and then dried in the air at 120° C. for 2 hours. After drying, the alumina was impregnated with Mn in such a manner that $Mn_2O_3$ was contained in an amount of 10 wt % of the weight of the alumina. That is, 100 g of the alumina was impregnated with an aqueous solution obtained by dissolving 36.34 g of manganese nitrate hexahydrate in pure water. Thereafter, it was dried at a temperature of 120° C. in the air for 2 hours and further calcinated at a temperature of 700° C. As a result, a Mn-carried alumina catalyst was obtained.

(10) Fe-Carried Alumina Catalyst

Commercially available granular alumina having a particle diameter of from 2 to 4 mm (NKHD-24 produced by Sumitomo Chemical Industries, Ltd.) was pulverized to a diameter of from 0.5 to 1 mm, and then dried in the air at 120° C. for 2 hours. After drying, the alumina was impregnated with Fe in such a manner that $Fe_2O_3$ was contained in an amount of 10 wt % of the weight of the alumina. That is, 100 g of the alumina was impregnated with an aqueous solution obtained by dissolving 50.59 g of iron nitrate nonahydrate in pure water. Thereafter, it was dried at a temperature of 120° C. in the air for 2 hours and further calcinated at a temperature of 700° C. As a result, a Fe-carried alumina catalyst was obtained.

(11) Pd and W-Carried Titania Catalyst

Commercially available granular titania (CS-224 produced by Sakai Chemical Industry Co., Ltd.) was pulverized and classified to obtain particles having a diameter of from 0.5 to 1 mm, and then heated to 120° C. for 2 hours. 100 g of the resulting titania was impregnated with a hydrogen peroxide solution containing 82.2 g of ammonium paratungstate dissolved therein, and then again heated to 120° C. for 2 hours and to 500° C. for further 2 hours. 100 g of the resulting tungsten-carried titania was impregnated with a solution obtained by dissolving 11.26 g of a palladium nitrate solution containing 4.439 wt % of Pd as a metal. Thereafter, it was dried at a temperature of 120° C. in the air for 2 hours and further calcinated at a temperature of 700° C. The amount of tungsten as $WO_3$ was 71.9 wt % of the titania.

(12) Co-Carried Alumina Catalyst

Commercially available granular alumina having a particle diameter of from 2 to 4 mm (NKHD-24 produced by Sumitomo Chemical Industries, Ltd.) was pulverized to a diameter of from 0.5 to 1 mm, and then dried in the air at 120° C. for 2 hours. After drying, the alumina was impregnated with Co in such a manner that $CO_3O_4$ was contained in an amount of 10 wt % of the weight of the alumina. That is, 100 g of the alumina was impregnated with an aqueous solution obtained by dissolving 36.23 g of cobalt nitrate hexahydrate in pure water. Thereafter, it was dried at a temperature of 120° C. in the air for 2 hours and further calcinated at a temperature of 700° C. As a result, a Co-carried alumina catalyst was obtained.

Figure 8:
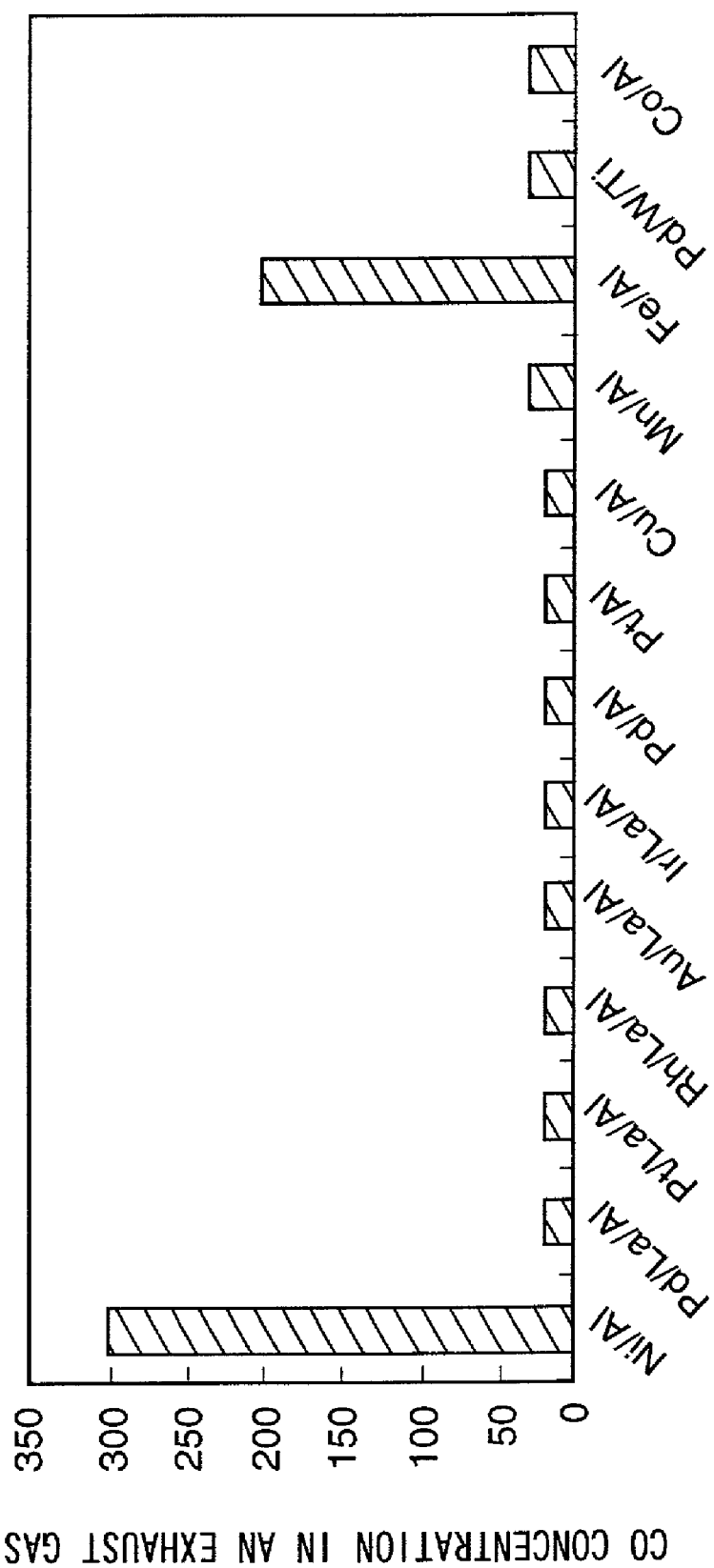
FIG. 8 is a graph showing CO concentrations in an exhaust gas scrubbing tower upon decomposing $C_4F_8$ with various materials for a harmful component removing catalyst.

FIG. 8 is a graph showing CO concentrations after lapsing 1 hour from the start of the experiment in the case where the treatment is conducted by using only the fluorine compounds decomposition catalyst containing aluminum and nickel as an oxide (the bar on the extreme left) and the cases where the treatment is conducted by using both the fluorine compounds decomposition catalyst and the harmful component removing catalyst. The measurement of the CO concentration was conducted by a TCD gas chromatography.

It is understood from FIG. 8 that the CO concentration is remarkably high in the case of the Al—Ni catalyst containing aluminum and nickel as an oxide. The CO concentration was remarkably low in the case where both the fluorine compounds decomposition catalyst and the harmful component removing catalyst were used, provided that the CO decomposition effect of the Fe-carried alumina catalyst was poor in comparison to the other catalysts.

EXAMPLE 8

A decomposition treatment of fluorine compounds containing $C_2F_6$ was conducted by using the apparatus shown in FIG. 1, in which an Al—Ti catalyst containing aluminum and titanium as an oxide as the fluorine compounds decomposition catalyst 2 and a Pd and La-carried alumina catalyst as the harmful component removing catalyst 3. The experiment was conducted for both the cases where the harmful component removing catalyst 3 was used and was not used. The material, the composition and the preparation method of the harmful component removing catalyst 3 were the same as in Example 8. The conditions, such as concentrations of the gas to be processed and the reaction temperature at the inlet of the reactor 1, were the same as in Example 8. The Al—Ti catalyst was prepared in the following manner. Commercially available boehmite powder was dried by calcinated at a temperature of 120° C. for 1 hour. 248.4 g of a titanium sulfate solution containing 30 wt % of titanium was mixed and kneaded with 200 g of the powder while pure water was added thereto. After mixing and kneading, the mixture was dried at a temperature of from 250 to 300° C. for about 5 hours and at a temperature of 700° C. for 2 hours. The thus resulting powder was put in a metallic mold and subjected to compression molding at a pressure of 500 kgf/cm$^2$. The molded article was pulverized and classified to obtain a particle diameter of from 0.5 to 1 mm. A catalyst containing 90 mol % of Al and 10 mol % of Ti was thus obtained.

As a result of the experiment, the CO concentration flowing out from the gas scrubbing tower after lapsing one hour from the start of the treatment was about 350 ppm when the treatment was conducted by using only the Al—Zn catalyst, but was improved to 1 ppm when the Pd and La-carried alumina catalyst was also used.

EXAMPLE 9

A decomposition treatment of a fluorine compounds containing $C_2F_6$ was conducted by using the apparatus shown in FIG. 1, in which an Al—Ti catalyst containing aluminum and titanium as an oxide as the fluorine compounds decomposition catalyst 2 and a Pd and La-carried alumina catalyst as the harmful component removing catalyst 3. The experiment was conducted for both the cases where the harmful component removing catalyst 3 was used and was not used. The material, the composition and the preparation method of the harmful component removing catalyst 3 were the same as in Example 8. The conditions, such as concentrations of the gas to be processed and the reaction temperature at the inlet of the reactor 1, were the same as in Example 8. The Al—Ti catalyst was prepared in the following manner. Commercially available boehmite powder was dried by calcinated at a temperature of 120° C. for 1 hour. 248.4 g of a titanium sulfate solution containing 30 wt % of titanium was mixed and kneaded with 200 g of the powder while pure water was added thereto. After mixing and kneading, the mixture was dried at a temperature of from 250 to 300° C. for about 5 hours and at a temperature of 700° C. for 2 hours. The thus resulting powder was put in a metallic mold and subjected to compression molding at a pressure of 500 kgf/cm2. The molded article was pulverized and classified to obtain a particle diameter of from 0.5 to 1 mm. A catalyst containing 90 mol % of Al and 10 mol % of Ti was thus obtained.

As a result of the experiment, the CO concentration flowing out from the gas scrubbing tower after lapsing one hour from the start of the treatment was about 320 ppm when the treatment was conducted by using only the Al—Ti catalyst, but was improved to 1 ppm when the Pd and La-carried alumina catalyst was also used.

EXAMPLE 10

Figure 9:
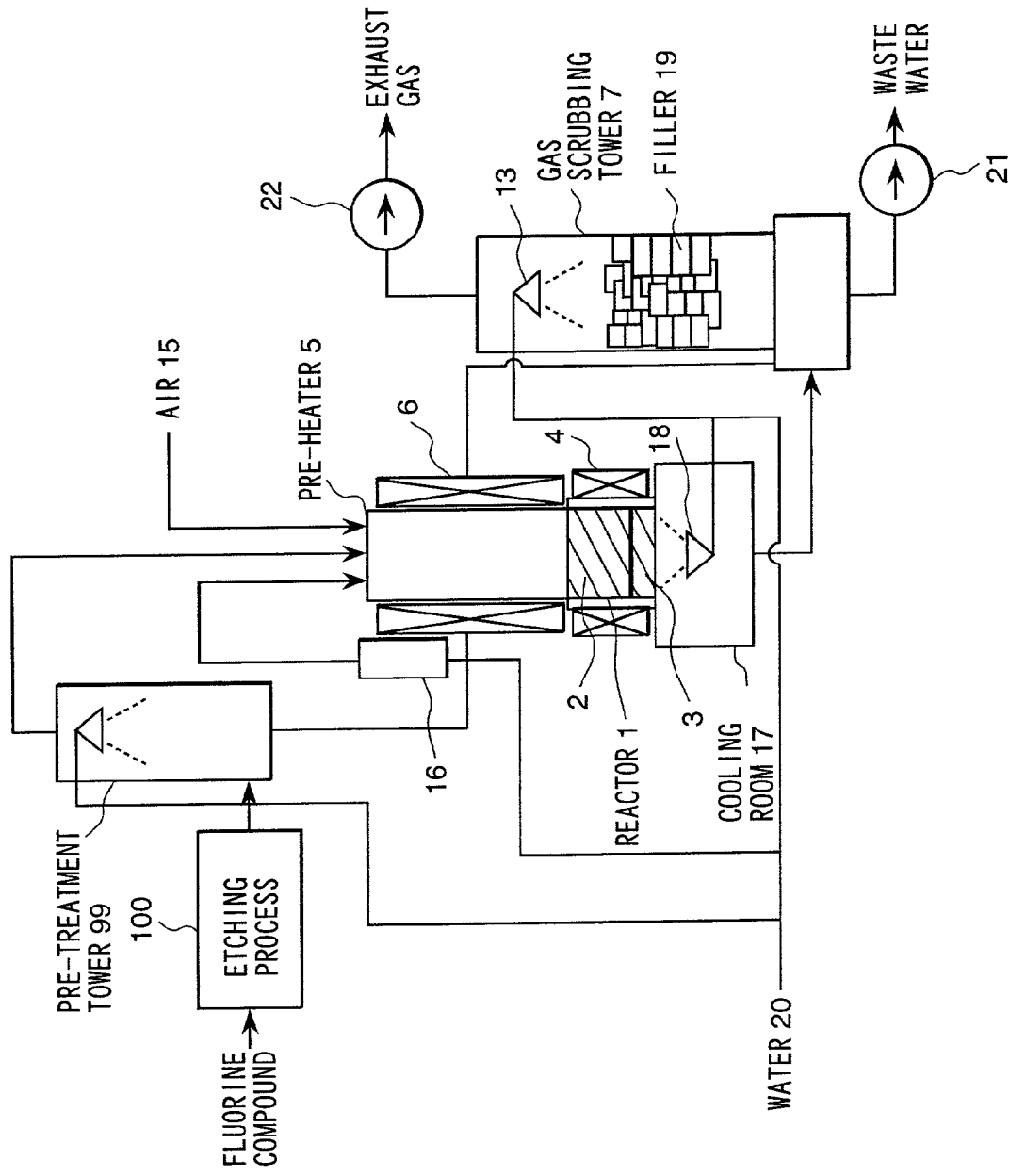
FIG. 9 is a schematic diagram showing an example, in which one embodiment of an apparatus for the decomposition of fluorine compounds according to the invention is provided on a semiconductor etching line.

FIG. 9 is a schematic diagram showing an example, in which the apparatus for the decomposition of fluorine compounds according to the invention is provided on a semiconductor etching line.

In a semiconductor etching process 100, a gaseous fluorine compound such as $SF_6$ and a mixed gas of $CF_4$ and $CHF_3$, is introduced into an etching chamber of reduced pressure to excite plasma, which is reacted with a semiconductor wafer. Thereafter, the gas inside the etching chamber is sucked by a vacuum pump, at which the concentration of the fluorine compounds becomes about from 0.5 to 5 vol % since a nitrogen gas is flushed for protection of the pump. The apparatus for the decomposition of fluorine compounds according to the invention has a pre-treatment tower 99 for scrubbing the gas discharged from the etching chamber. A water soluble component contained in the gas is removed in the pre-treatment tower 99.

The gas having been treated in the pre-treatment tower 99 is fed to a pre-heater 5 for heating. The air 15 and water 20 are also fed to the pre-heater 5. It is preferred that the water 20 is fed to the pre-heater after removing impurities, such as calcium, contained in the water by passing through an ion exchange resin 16. The concentration of the fluorine compounds is adjusted to a range of about from 0.1 to 5 vol % at the pre-heater 5. The amount of water is adjusted to a range of about from 5 to 75 times the molar number of the fluorine compounds. The amount of the air is adjusted to make the oxygen concentration be a range of about from 0.2 to 15 vol %. The gas to be processed having the concentrations thus adjusted is heated to a temperature of from 650 to 850° C. by using a heater 6, such as an electric furnace, and supplied to a reactor 1. A fluorine compounds decomposition catalyst 2 and a harmful component removing catalyst 3 are charged in the reactor 1. It is preferred that the reactor 1 is also heated to a temperature of about from 650 to 850° C. by a heater 4, such as an electric furnace. The gas to be treated supplied to the reactor 1 is firstly made in contact with the fluorine compounds decomposition catalyst 2, whereby the fluorine compounds are reacted with water to decompose the fluorine compounds to hydrogen fluoride and carbon monoxide or $SO_2F_2$. Thereafter, the gas is made in contact with the harmful component removing catalyst 3, whereby carbon monoxide, carbon dioxide, $SO_3$ and $SO_2F_2$ are decomposed. The gas emitted from the reactor 1 is supplied to a cooling chamber 17 to cool, for example, by spraying water from a spray nozzle 18. The gas emitted from the cooling chamber 17 is supplied to a gas scrubbing tower 7 for scrubbing with water sprayed from a spray nozzle 13, whereby hydrogen fluoride and other water soluble components are removed. It is preferred that a filler 19 formed from plastic particles is filled in the gas scrubbing tower 7 to ensure contact of the gas with water. The water absorbing hydrogen fluoride and other water soluble components in the gas scrubbing tower 7 is discharged from the gas scrubbing tower 7 by sucking with a pump 21, followed by treating, for example, in a waste water treatment apparatus. The gas, from which hydrogen fluoride and other water soluble components are removed in the gas scrubbing tower 7, is discharged from the gas scrubbing tower 7 by sucking with a blower 22.

Figure 10:
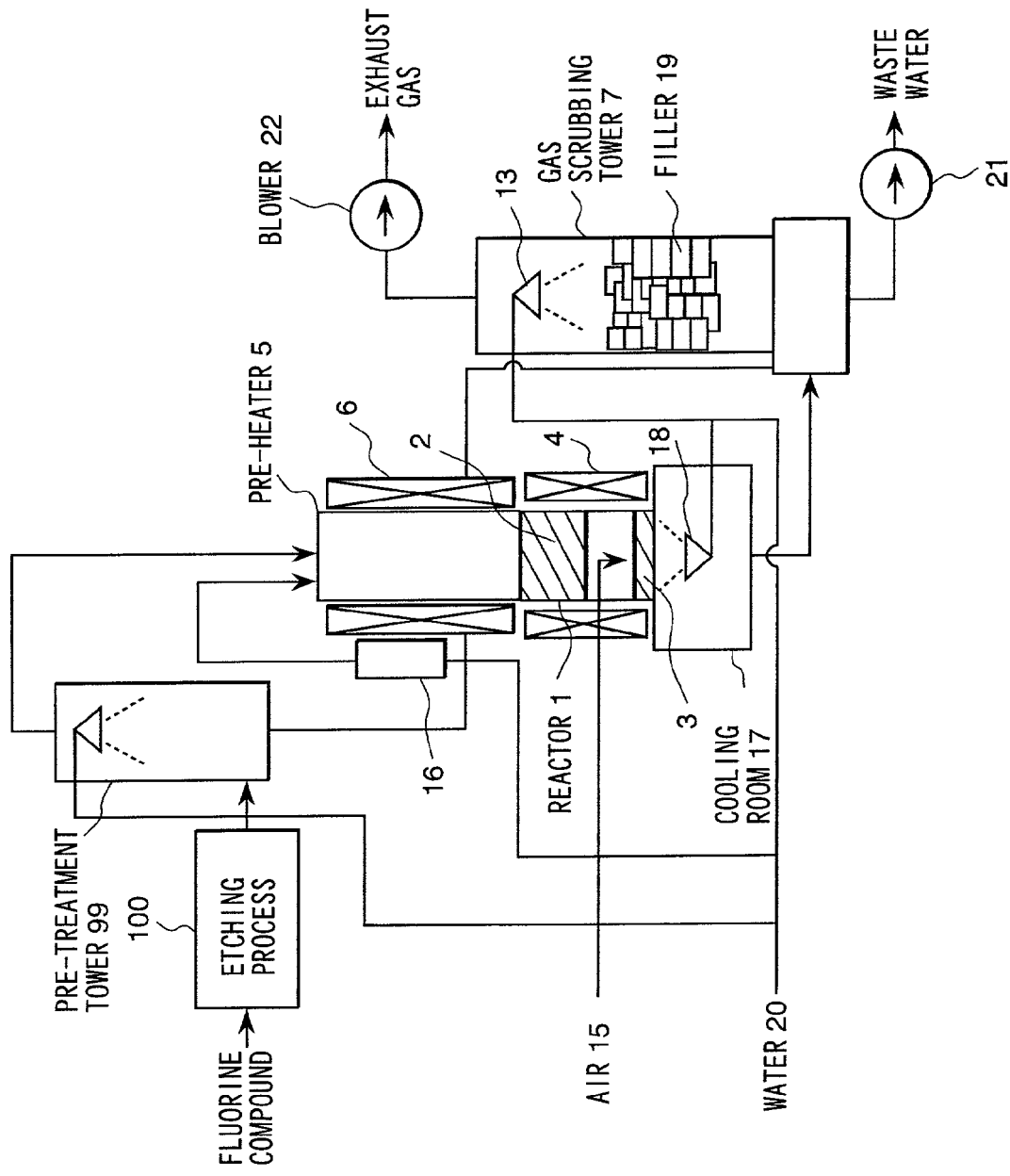
FIG. 10 is a schematic diagram showing an example, in which another embodiment of an apparatus for the decomposition of fluorine compounds according to the invention is provided on a semiconductor etching line.

FIG. 10 shows another example according to the invention. The point of the apparatus shown in FIG. 10 that is different from the apparatus shown in FIG. 9 is that, in FIG. 10, the air 15 is added to the gas supplied to the harmful component removing catalyst 3 in the reactor 1. It is also possible by the manner of this embodiment that the fluorine compound is decomposed, and CO or $SO_2F_2$ formed by the decomposition of the fluorine compounds can also be removed as similar to the embodiment shown in FIG. 9. The gas emitted from the reactor 1 is supplied to a cooling chamber 17 to cool, for example, by spraying water from a spray nozzle 18.

INDUSTRIAL APPLICABILITY

In the field of semiconductors, a fluorine compound such as $C_2F_6$, $CF_4$, $CHF_3$ and $SF_6$, is used for etching or cleaning a semiconductor. $SF_6$ is used as an insulating medium of a circuit breaker. It is extremely effective to propose a process for decomposing the fluorine compounds as a treating method of the fluorine compounds.

The invention is to convert a fluorine compounds to a substance that can be absorbed by water or an alkaline aqueous solution, and to decompose a harmful substance formed thereon, such as CO, $N_2O$ and $SO_2F_2$, and therefore the invention has great industrial applicability.

What is claimed is:

1. An apparatus for decomposing fluorine compounds which contain at least one of PFC, HFC, $SF_6$ and $NF_3$, said apparatus comprising a single reactor having means therein for holding a fluorine compound decomposition catalyst for decomposing said fluorine compounds charged into said reactor in an upstream portion thereof and means therein for holding a harmful compound removing catalyst having a reaction temperature of 650-850° C. for the decomposition of at least one of $SO_2F_2$ and $N_2O$, formed by said decomposition, charged into said reactor at a portion downstream of where said decomposition catalyst is charged into said reactor whereby said catalysts are contained in said reactor in pile form; a single heater for heating said catalysts in said reactor; a moisture supplying unit for adding moisture to said fluorine compound supplied to said reactor; an inert gas supplying unit for adding an inert gas as a dilutent gas; and an oxygen supplying unit for adding oxygen or an oxygen-containing gas to a gas containing at least one of $SO_2F_2$ and $N_2O$ formed by decomposition of said fluorine compounds.

2. An apparatus for decomposing fluorine compounds as claimed in claim 1, wherein said harmful compound removing catalyst for the decomposition of at least one of $SO_2F_2$ and $N_2O$, contains at least one component selected from Pd, Pt, Cu, Mn, Fe, Co, Rh, Ir and Au, in the form of a metal or an oxide.

3. An apparatus for decomposing fluorine compounds as claimed in claim 1, wherein said harmful compound removing catalyst for the decomposition of at least one of $SO_2F_2$ and $N_2O$ is selected from a catalyst of Pd and La carried on alumina, a catalyst of Pt and La carried on alumina, a catalyst of Rh and La carried on alumina, a catalyst of Au and La carried on alumina, a catalyst of Ir and La carried on alumina, a catalyst of Pd carried on alumina, a catalyst of Pt carried on alumina, a catalyst of Cu carried on alumina, a catalyst of Mn carried on alumina, a catalyst of Pd and W carried on titania and a catalyst of Co carried on alumina.

4. An apparatus for decomposing fluorine compounds as claimed in claim 1, further comprising a gas scrubbing tower for removing hydrogen fluoride and other water soluble components from a gas discharged from said reactor by contacting said gas with water or an alkaline aqueous solution.

5. An apparatus for decomposing fluorine compounds as claimed in claim 1, wherein said catalyst for decomposing fluorine compounds includes a combination of aluminum and nickel in the form of an oxide.

\* \* \* \* \*